J. FRANK.
Wagon-Axle.

No. 218,956. Patented Aug. 26, 1879.

Witnesses:
George H. Renwith
Byron A. Tyler

Inventor:
James Frank
Per E. O. Frank
his Atty

UNITED STATES PATENT OFFICE.

JAMES FRANK, OF INDIANAPOLIS, INDIANA.

IMPROVEMENT IN WAGON-AXLES.

Specification forming part of Letters Patent No. 218,956, dated August 26, 1879; application filed November 30, 1878.

*To all whom it may concern:*

Be it known that I, JAMES FRANK, of Indianapolis, in the county of Marion and State of Indiana, have invented a new and useful Improvement in Means for Securing Thimble-Skeins to Wooden-Axles, and for preventing the nut from working off, of which the following is a description, reference being had to the accompanying drawings.

The object of my invention is to strengthen a wooden axle, and at the same time provide a means of securing the thimble-skeins to the axle, and also prevent the nut that secures the wheel on said axle from working off.

My invention consists in the new construction and arrangement of parts, and in the new combination of elements, whereby the axle is strengthened, the thimble-skein secured from working loose, and the nut that holds the wheel on the skein prevented from working off, as will be hereinafter described and set forth.

Figure 3:
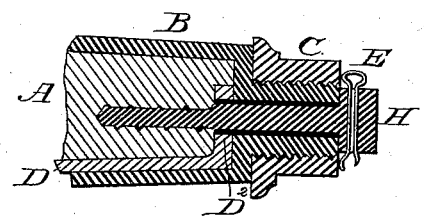
Figure 1:
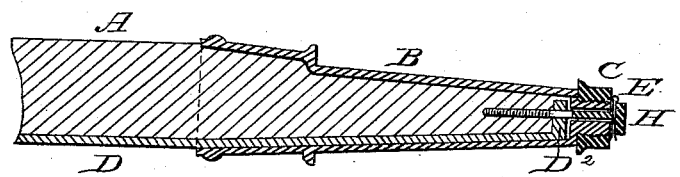
Figure 2:
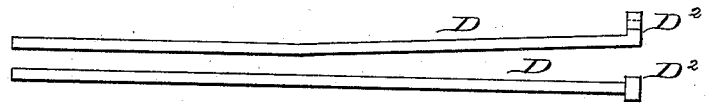

In the accompanying drawings, in which like letters of reference in the different figures indicate like parts, Figure 1 represents a longitudinal sectional view of a wooden axle and thimble-skein embodying my invention. Fig. 2 is a plan and side view of the strengthening-bar, which is also used in connection with the lag-screw to hold the skeins on the axle, and prevent the nuts that secure the wheels from working off. Fig. 3 is an enlarged sectional view, the same as that shown in Fig. 1.

A represents a wooden axle, on which are mounted the thimble-skeins B, with nut C for holding the wheel on the skein, all of which are of the ordinary form.

The bar or rod D is let into a groove formed in the under side of the axle, that is covered by the skein, and each end of the bar D is provided with bent ends $D^2$, that are furnished with holes to receive the lag-screws H.

When the bar D is inserted in the groove formed in the axle A the bent ends $D^2$ abut against the ends of the axle inside of the skeins B, and the skeins are secured thereon by the lag-screws H, which are inserted in the holes formed in the end of the skeins, and also through the holes formed in the bent ends $D^2$ of the bar D, and are then screwed home in the ends of the axle, thus binding the two skeins at each end of the axle.

The head of the lag-screw H is provided with a hole to receive the split pin E, and prevent the wheel-nuts from working off.

It will be observed that when the two skein-boxes B are secured at opposite ends of the axle by the continuous rod D and lag-screws H the axle is materially strengthened by the bar, and neither of the skeins can possibly get loose on the axle.

The wheel, (not shown,) when placed on the skein, is secured by the nut C in the ordinary manner; but when the split key or pin E is inserted in the hole formed in the head of the lag-screw H the pin acts as a lock to the nut, thus preventing it from working off.

What I claim is—

1. The bar D, having bent ends $D^2$, provided with holes to receive the lag-screws H, combined with the lag-screws H, having pin-holes in their heads, and split pins E, whereby a wooden axle is strengthened, and the skeins held in position on said axle, and the wheel-nuts prevented from working off, substantially as shown and described.

2. The bar D, having bent perforated ends $D^2$ $D^2$, combined with an axle, A, skeins B, and lag-screws H, as and for the purpose specified.

In testimony whereof I have signed my name to this specification in the presence of two subscribing witnesses.

JAMES FRANK.

Witnesses:
 E. O. FRINK,
 GEORGE RENNETT.